US012789699B2

(12) United States Patent
Yamasaki et al.

(10) Patent No.: US 12,789,699 B2
(45) Date of Patent: Nov. 10, 2026

(54) HEADLIGHT CONTROLLER

(71) Applicant: SUBARU CORPORATION, Tokyo (JP)

(72) Inventors: Kentaro Yamasaki, Tokyo (JP); Makoto Kinoshita, Tokyo (JP); Noriaki Asano, Tokyo (JP); Shunichi Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 112 days.

(21) Appl. No.: 18/905,293

(22) Filed: Oct. 3, 2024

(65) Prior Publication Data

US 2025/0074294 A1 Mar. 6, 2025

Related U.S. Application Data

(63) Continuation of application No. PCT/JP2023/032517, filed on Sep. 6, 2023.

(51) Int. Cl.
*B60Q 1/14* (2006.01)

(52) U.S. Cl.
CPC ........ *B60Q 1/1423* (2013.01); *B60Q 2300/41* (2013.01)

(58) Field of Classification Search
CPC .. B60Q 1/1423; B60Q 1/143; B60Q 2300/41; B60Q 2300/42; B60Q 2300/056
See application file for complete search history.

(56) References Cited

U.S. PATENT DOCUMENTS 4,967,319 A 10/1990 Seko
5,645,338 A 7/1997 Kobayashi
(Continued)

FOREIGN PATENT DOCUMENTS

JP H10-151987 A 6/1998
JP 2002-19517 A 1/2002
(Continued)

OTHER PUBLICATIONS

International Search Report dated Nov. 14, 2023, from corresponding International Application No. PCT/JP2023/032517 (non-English).
(Continued)

*Primary Examiner* — Alexander H Taningco
*Assistant Examiner* — Pedro C Fernandez
(74) *Attorney, Agent, or Firm* — Rimon P.C.

(57) ABSTRACT

A headlight controller controls a headlight unit that sends out illumination light frontward of a vehicle. The headlight controller includes an inter-vehicle distance obtainer, a light distribution controller, and an illumination controller. The inter-vehicle distance obtainer acquires an inter-vehicle distance from the vehicle to a vehicle in front traveling in front of the vehicle. The light distribution controller partially dims or shades a range corresponding to a position of the vehicle in front. When the inter-vehicle distance is less than a first distance, the illumination controller reduces at least an amount of illumination light in an illumination range of a low beam out of the illumination range of the low beam and an illumination range of a high beam by the headlight unit, regardless of operation of the light distribution controller.

21 Claims, 4 Drawing Sheets

(56) References Cited

U.S. PATENT DOCUMENTS

| | | | | |
|---|---|---|---|---|
| 6,550,944 | B2 | 4/2003 | Kusagaya | |
| 9,738,214 | B2 * | 8/2017 | Nakatani | F21S 41/143 |
| 2002/0003473 | A1 | 1/2002 | Makita et al. | |
| 2015/0002015 | A1 * | 1/2015 | Hayakawa | G06V 20/584 315/82 |
| 2023/0311744 | A1 * | 10/2023 | Yamamoto | F21S 41/663 362/466 |
| 2025/0033556 | A1 * | 1/2025 | Yamasaki | B60Q 1/143 |
| 2025/0074294 | A1 | 3/2025 | Yamasaki et al. | |

FOREIGN PATENT DOCUMENTS

| | | | |
|---|---|---|---|
| JP | 2019-43260 | A | 3/2019 |
| JP | 2022-12224 | A | 1/2022 |
| JP | 2022-70295 | A | 5/2022 |
| WO | 2022/131044 | A1 | 6/2022 |

OTHER PUBLICATIONS

International Search Report dated Oct. 3, 2023, from corresponding International Application No. PCT/JP2023/027821.

* cited by examiner

[ FIG. 1 ]
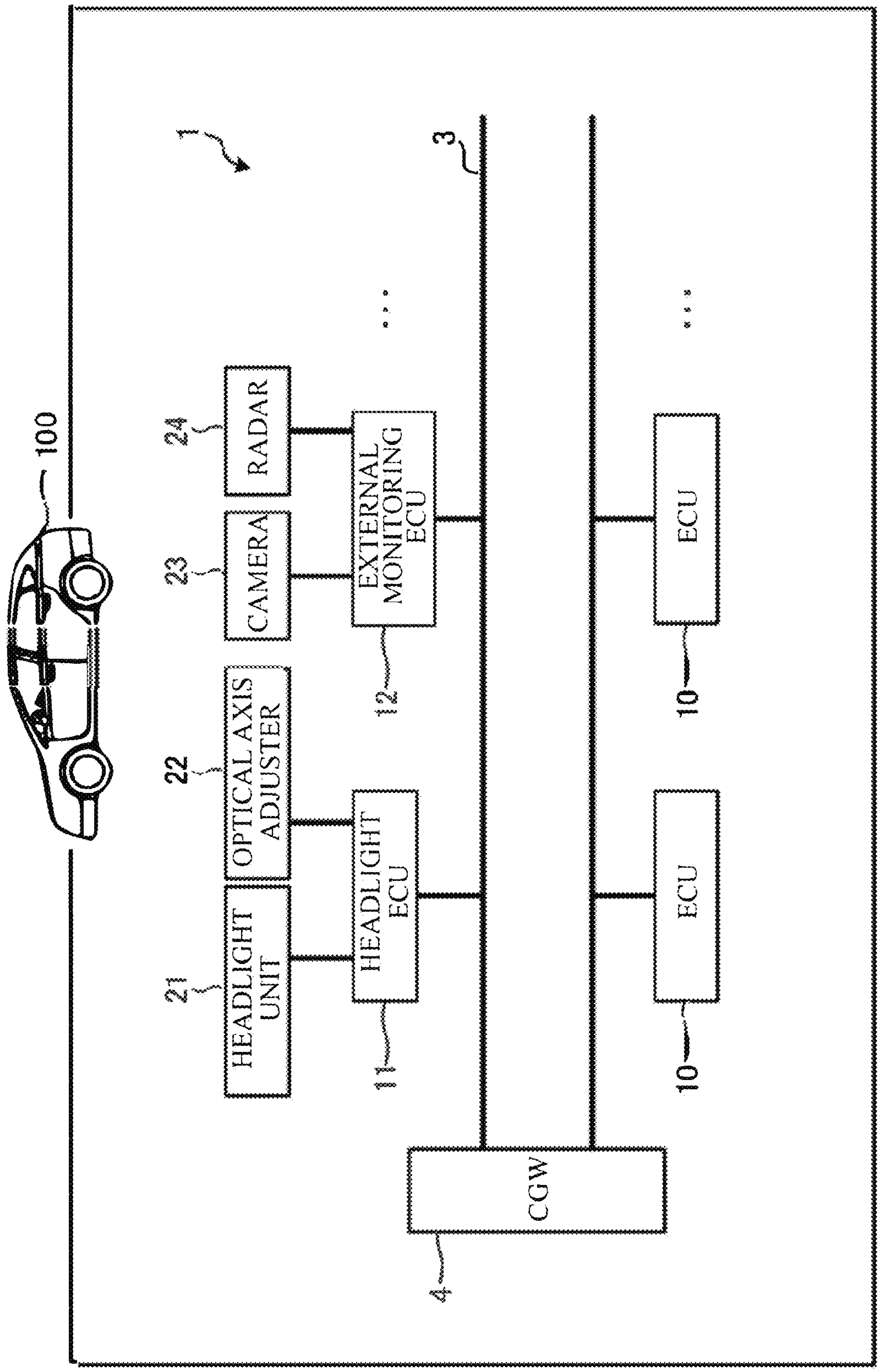

[ FIG. 2 ]
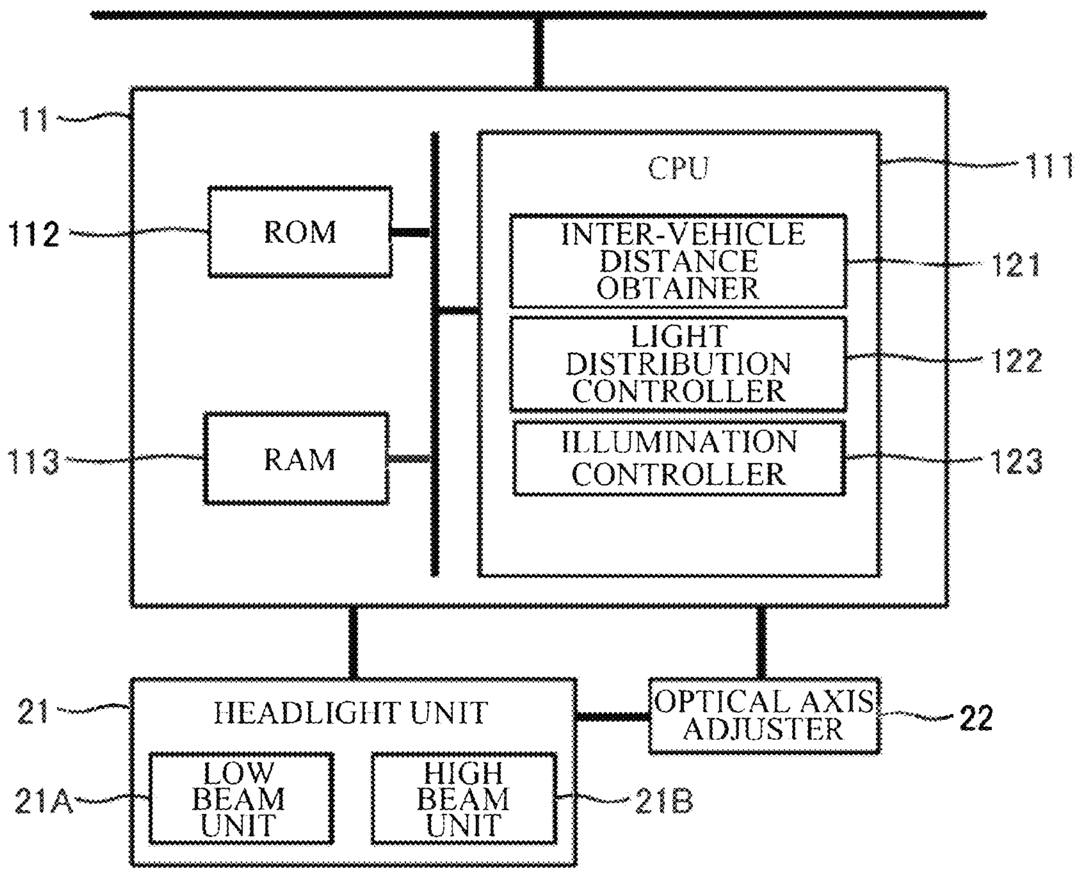

[ FIG. 3 ]
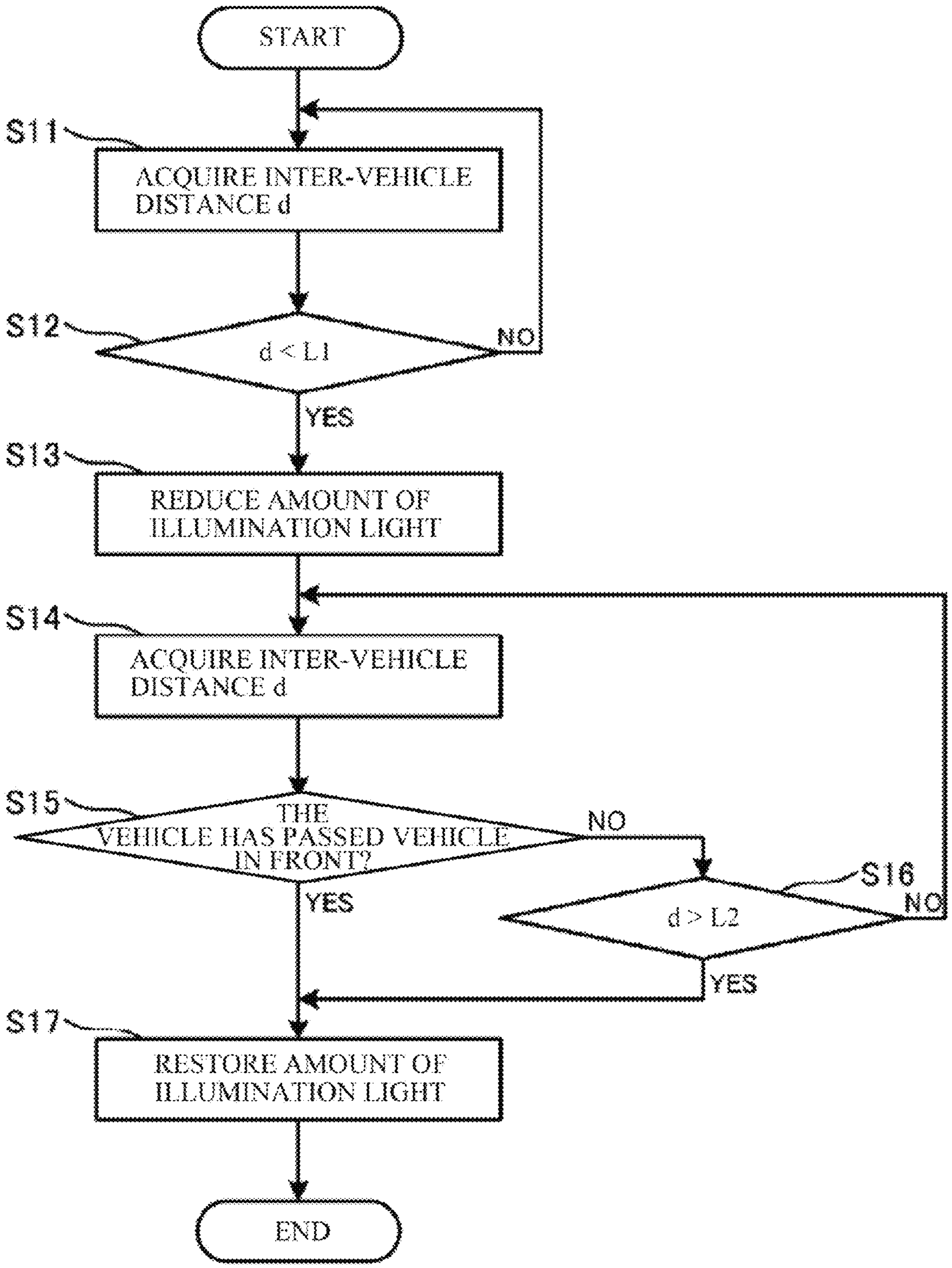

[ FIG. 4 ]
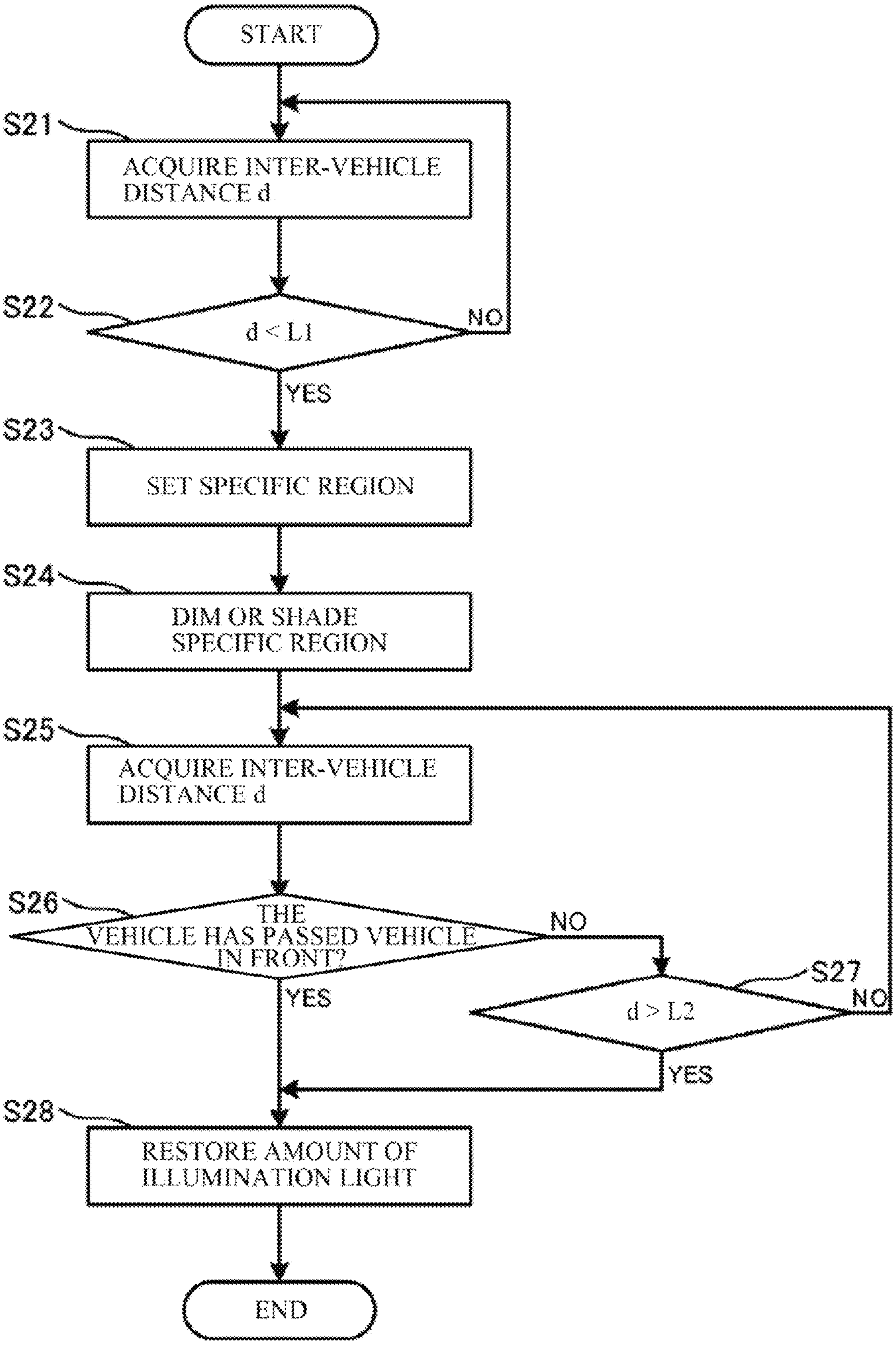

HEADLIGHT CONTROLLER

CROSS-REFERENCE TO RELATED APPLICATIONS

This application is continuation of International Application No. PCT/JP2023/032517, filed on Sep. 6, 2023, the entire contents of which are hereby incorporated by reference.

BACKGROUND

The disclosure relates to a headlight controller configured to control headlights mounted on a vehicle.

Headlights mounted on a vehicle are configured to send out light generated from a light source, frontward of the vehicle through an optical system such as lenses, while appropriately switching between a low beam and a high beam. Reference may be made to, for example, Japanese Unexamined Patent Application Publication (JP-A) No. 2019-43260. An illumination range of the low beam and an illumination range of the high beam by the headlights are each adjusted in accordance with the laws and regulations of the country in which the vehicle including the headlights travels. In general, the low beam is adjusted to allow an upper end of the illumination range, i.e., a cut-off line, to be level with or lower than a ground level of the headlights, to mitigate glare to a preceding vehicle or an oncoming vehicle. The high beam is adjusted to illuminate a higher and farther region than the low beam.

For example, a vehicle including headlights usually uses the high beam on nighttime travel to ensure visibility to a driver. When there are any vehicles in front, e.g., a preceding vehicle or an oncoming vehicle, or any pedestrians, the vehicle including the headlights uses the low beam to mitigate glare to the vehicles in front or the pedestrians.

When a light distribution control by an ADB (Adaptive Driving Beam) is performed on the headlights, while the vehicle is traveling with the high beam, the vehicle determines presence or absence of any vehicles in front or any pedestrians, and identifies their positions. The vehicle partially dims or darkens the illumination ranges of the headlights corresponding to the identified positions, to mitigate glare to the vehicles in front, etc.

SUMMARY

An aspect of the disclosure provides a headlight controller configured to control a headlight unit. The headlight unit is configured to send out illumination light frontward of a vehicle. The headlight controller includes an inter-vehicle distance obtainer, a light distribution controller, and an illumination controller. The inter-vehicle distance obtainer is configured to acquire an inter-vehicle distance from the vehicle to a vehicle in front traveling in front of the vehicle. The light distribution controller is configured to partially dim or shade a range corresponding to a position of the vehicle in front. The illumination controller is configured to reduce an amount of illumination light of a low beam by the headlight unit when the inter-vehicle distance is less than a first distance. The illumination controller is configured to, when the inter-vehicle distance is less than the first distance, reduce at least the amount of illumination light in an illumination range of the low beam out of the illumination range of the low beam and an illumination range of a high beam by the headlight unit, regardless of operation of the light distribution controller.

An aspect of the disclosure provides a headlight controller configured to control a headlight unit including a light source. The headlight unit is configured to send out illumination light frontward of a vehicle. The headlight controller includes circuitry configured to: acquire an inter-vehicle distance from the vehicle to a vehicle in front traveling in front of the vehicle; partially dim or shade a range corresponding to a position of the vehicle in front; and reduce an amount of illumination light of a low beam by the headlight unit when the inter-vehicle distance is less than a first distance. The circuitry is configured to, When the inter-vehicle distance is less than the first distance, reduce at least the amount of illumination light in an illumination range of the low beam out of the illumination range of the low beam and an illumination range of a high beam by the headlight unit, regardless of whether to partially dim or shade the range corresponding to the position of the vehicle in front.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a schematic diagram of an overall configuration of a vehicle control system including a headlight ECU according to an embodiment of the disclosure.

FIG. 2 is a schematic diagram of an overall configuration of the headlight ECU according to the embodiment of the disclosure.

FIG. 3 is a flowchart of control processing of a headlight unit by the headlight ECU according to the embodiment of the disclosure.

FIG. 4 is a flowchart of control processing of a headlight unit by a headlight ECU according to a modification example of the embodiment of the disclosure.

DETAILED DESCRIPTION

In a vehicle having a large vehicle height or a vehicle including high mounted headlights, the ground level of the headlights is relatively high. For that, the illumination ranges of the low beam and the high beam are also high. This may easily contribute to glare to the vehicles in front, etc. In particular, headlights having a large amount of illumination light and high intensity of illumination have been recently in wide use. Such headlights may easily produce glare to the vehicles in front, etc. by their high intensity of illumination.

As mentioned, the illumination range of the low beam is limited downward by adjusting the upper end of the illumination range to be level with or lower than the ground level of the headlights. However, when the ground level of the headlights is relatively high, or when the headlights have a large amount of illumination light, even such a low beam may sometimes produce glare to the vehicles in front. Meanwhile, adjusting the illumination range of the low beam downward to cancel out the high ground level of the headlights may possibly lower the visibility to a driver.

Moreover, when the illumination ranges of the headlights are located at a higher position, partially dimming or darkening the illumination ranges of the headlights by the ADB may sometimes fail in sufficient glare mitigation.

It is desirable to provide a headlight controller that makes it possible to mitigate glare to vehicles in front, etc. with respect to headlights provided in a vehicle having a large vehicle height, and headlights having high intensity of illumination.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to any embodiment of the disclosure are unillustrated in the drawings.

As illustrated in FIGS. 1 and 2, a headlight ECU 11 according to an embodiment of the disclosure is configured to control a headlight unit 21 to be attached to a vehicle 100. In one embodiment of the disclosure, the headlight ECU 11 may serve as a "headlight controller". The headlight unit 21 is described later. The headlight ECU 11 may serve as a portion of a vehicle control system 1 to be mounted on the vehicle 100.

The vehicle control system 1 may include multiple in-vehicle ECUs (Electronic Control Unit) 10 configured to control various electronic devices to be involved in travel of the vehicle 100. As some of the in-vehicle ECUs 10, the vehicle control system 1 may include, for example, the headlight ECU 11 and an external monitoring ECU 12.

The in-vehicle ECUs 10, the headlight ECU 11, the external monitoring ECU 12, etc. may be communicatably coupled to one another through an in-vehicle network 3 such as a CAN (Controller Area Network) or a LIN (Local Interconnect Network). The in-vehicle ECUs 10, the headlight ECU 11, the external monitoring ECU 12, etc. may be coupled to a central gateway (CGW) 4 as a relay device to constitute the vehicle control system 1.

The in-vehicle ECUs 10, the headlight ECU 11, and the external monitoring ECU 12 may be coupled to electronic devices as their respective control targets, and control operation of the electronic devices to which they are coupled, based on information, or data, to be acquired from the in-vehicle network 3. The in-vehicle ECUs 10 may each output, to the in-vehicle network 3, information indicating a state such as an operation state of the electronic devices to which they are coupled.

The in-vehicle ECUs 10, the headlight ECU 11, and the external monitoring ECU 12 may include, for example, a processor such as a CPU (Central Processing Unit) or an MPU (Micro Processing Unit), electric circuitry, and storage elements such as a RAM (Random Access Memory) and a ROM (Read Only Memory). A part or all of operation to be carried out by the in-vehicle ECUs 10 may be realized by hardware such as an ASIC (application specific integrated circuit), an FPGA (field-programmable gate array), or a GPU (Graphics Processing Unit).

In the following description, detailed description and illustration of the electronic devices, the in-vehicle ECUs 10, etc. that do not directly participate in the operation of the headlight ECU 11 are omitted.

The headlight ECU 11 may be coupled to the headlight unit 21 provided in a front part of the vehicle 100, and control the headlight unit 21. To the headlight ECU 11, an optical axis adjuster 22 may be coupled. The optical axis adjuster 22 may adjust an optical axis of the headlight unit 21 in accordance with an instruction from the headlight ECU 11. Details of the headlight ECU 11 are given later.

The headlight unit 21 may generally include a low beam unit 21A and a high beam unit 21B. The low beam unit 21A and the high beam unit 21B may be provided on each of front right side and front left side of the vehicle. The low beam unit 21A may send out a low beam and be called a headlight for passing. The high beam unit 21B may send out a high beam and be called a headlight for travel. The low beam unit 21A and the high beam unit 21B may each include a light source such as an LED, a reflector, and a lens, neither of which are illustrated. The reflector may guide light emitted from the light source, frontward of the vehicle 100. The lens may cause illumination with the light emitted from the light source, in a predetermined light distribution pattern.

The low beam unit 21A may illuminate a range that is lower than an illumination range of the high beam and close to the vehicle 100, to mitigate glare to vehicles and pedestrians around the vehicle 100. Accordingly, an illumination range of the low beam by the low beam unit 21A may be set to make it possible to check a possible obstacle that may inhibit the travel of the vehicle 100, e.g., vehicles in front and pedestrians present at a distance of about 40 meters in front of the vehicle 100.

The high beam unit 21B may illuminate a farther range with higher intensity of illumination than the illumination range of the low beam, to enhance visibility to the driver while the vehicle 100 is traveling. Accordingly, the illumination range of the high beam by the high beam unit 21B may be set to make it possible to check a possible obstacle that may inhibit the travel of the vehicle 100, e.g., vehicles in front and pedestrians present at a distance of about 100 meters in front of the vehicle 100.

The optical axis adjuster 22 may include, for example, a driving mechanism such as an electric actuator, and adjust the optical axis of the low beam unit 21A and the optical axis of the high beam unit 21B by operating the driving mechanism in accordance with an instruction from the headlight ECU 11. Allowing the optical axis adjuster 22 to vertically swing the optical axis of the low beam unit 21A and the optical axis of the high beam unit 21B to change an angle of each optical axis with respect to a horizontal direction makes it possible to displace each illumination range.

The external monitoring ECU 12 may constitute, for example, a part of an ADAS (Advanced Driver-Assistance Systems) that assists in driving the vehicle 100. The external monitoring ECU 12 may monitor external environment of the vehicle 100 by a sensor group included in the ADAS. The sensor group may include a camera 23, radar 24, and other various sensors. That is, the external monitoring ECU 12 may output, to the in-vehicle network 3, as peripheral information: images and various pieces of data acquired from the sensor group mentioned above; moving objects, structures, shapes of roads, etc. grasped based on the images and the various pieces of data; distances from the moving objects, the structures, the roads, etc. to the vehicle, and positional relation of the moving objects, the structures, the roads, etc., to the vehicle, without limitation. The moving objects may include pedestrians around the vehicle and other vehicles around the vehicle.

The camera 23 may be provided, for example, in an upper portion of a windshield of the vehicle 100 and at the vehicle-widthwise center of the windshield of the vehicle 100. The camera 23 may capture an image of a predetermined range in front of the vehicle 100. The radar 24 may be provided at multiple locations of the vehicle 100. The radar 24 may transmit radio waves of a predetermined wavelength, and receive reflected waves to measure a distance to an object such as another vehicle, a pedestrian, or a structure present in front of, behind, and sideward of the vehicle 100, and a direction of the object.

(Headlight ECU)

In the following, the headlight ECU 11 is described. In one embodiment of the disclosure, the headlight ECU 11 may serve as the "headlight controller". The headlight ECU 11 may refer to the information acquired from the in-vehicle ECUs mentioned above through the in-vehicle network 3, to control the headlight unit 21.

As illustrated in FIG. 2, the headlight ECU 11 may include a CPU (Central Processing Unit) 111, a ROM 112 and a RAM 113.

The CPU 111 may carry out various kinds of processing based on programs held in the ROM 112. In this embodiment, the CPU 111 may serve as an inter-vehicle distance obtainer 121, a light distribution controller 122, and an illumination controller 123 illustrated in FIG. 2 by reading the programs held in the ROM 112 into a memory such as the RAM 113 and executing the programs.

In the following, the inter-vehicle distance obtainer 121, the light distribution controller 122, and the illumination controller 123 are described.

The inter-vehicle distance obtainer 121 acquires an inter-vehicle distance d from the vehicle 100 to a vehicle in front traveling in front of the vehicle 100. The vehicle in front may include an oncoming vehicle and a preceding vehicle. An oncoming vehicle is a vehicle that faces the vehicle 100 and travels in an opposite direction to a direction of advance of the vehicle 100. A preceding vehicle is a vehicle that travels ahead of the vehicle 100 in the same direction of advance as the vehicle 100.

For example, the inter-vehicle distance obtainer 121 is configured to acquire, from the external monitoring ECU 12, the inter-vehicle distance d as a distance from the vehicle 100 to the vehicle in front calculated based on the image of the predetermined range in front of the vehicle 100 captured by the camera 23. Alternatively, the inter-vehicle distance obtainer 121 is configured to acquire the inter-vehicle distance d measured based on the transmitted waves and the received waves by the radar 24. The inter-vehicle distance obtainer 121 may acquire the inter-vehicle distance d by acquiring the image captured by the camera 23 through the external monitoring ECU 12 and performing predetermined image processing on the image.

The light distribution controller 122 may set light distribution patterns for the low beam unit 21A and the high beam unit 21B to illuminate their respective illumination ranges, and output a driving signal in accordance with the set light distribution patterns to the headlight unit 21. Moreover, the light distribution controller 122 is configured to make a light distribution variable control called the ADB (Adaptive Driving Beam). In the following, the light distribution variable control is referred to as an ADB control. For example, when a vehicle in front is present while the vehicle 100 is traveling while sending out the high beam, the light distribution controller 122 may set, by the ADB control, an illumination range of the high beam unit 21B, and set a light distribution pattern in which a region corresponding to a position of the vehicle in front, etc. within the illumination range of the high beam unit 21B is identified as a region to be partially dimmed or shaded.

When the inter-vehicle distance d from the vehicle 100 to the vehicle in front acquired by the inter-vehicle distance obtainer 121 becomes equal to or less than a certain distance, that is, when the inter-vehicle distance d is less than a predetermined distance L1, the illumination controller 123 controls the headlight unit 21 to reduce an amount of illumination light by the low beam unit 21A. The predetermined distance L1 may be set to any value. For example, the predetermined distance L1 may be set to a smaller distance than a distance at which switching from the low beam to the high beam is made.

This makes it possible for the illumination controller 123 to mitigate glare to be possibly produced as the vehicle in front further approaches the vehicle 100, when the switching from the high beam to the low beam has been made, and the low beam is being sent out to mitigate glare to the vehicle in front to be produced by the high beam.

The illumination controller 123 may reduce gradually or stepwise the amount of illumination light by the low beam unit 21A, in accordance with the inter-vehicle distance d. In other words, the illumination controller 123 may make a control to reduce the amount of illumination light by the low beam unit 21A as the inter-vehicle distance d becomes smaller. This leads to more effective mitigation of glare to the vehicle in front.

The illumination controller 123 controls the headlight unit 21 to reduce the amount of illumination light of the headlight unit 21 when the inter-vehicle distance d from the vehicle 100 to the vehicle in front is less than the predetermined distance L1, regardless of whether the light distribution controller 122 is carrying out the ADB control mentioned above.

As to the amount of illumination light by the headlight unit 21, for example, a pre-reduction amount of illumination light, an amount of illumination light to be reduced, and a post-reduction amount of illumination light may be determined as appropriate based on, for example, the ground level of the headlight unit 21 in the vehicle 100, and illumination ability of the headlight unit 21, etc. and held in, for example, the ROM 112 of the headlight ECU 11.

Moreover, after reducing the amount of illumination light of the low beam based on the inter-vehicle distance d being less than the predetermined distance L1, the illumination controller 123 may control the headlight unit 21 to restore the reduced amount of illumination light to the pre-reduction amount of illumination light in the following cases.

In a case where the vehicle in front is a preceding vehicle traveling ahead of the vehicle 100 in the same direction of advance as the vehicle 100, when the inter-vehicle distance d from the preceding vehicle to the vehicle 100 is larger than a predetermined distance L2, the illumination controller 123 may restore the reduced amount of illumination light to the pre-reduction amount of illumination light.

In a case where the vehicle in front is an oncoming vehicle with respect to the vehicle 100, after the vehicle 100 and the oncoming vehicle pass each other, the illumination controller 123 may restore the reduced amount of illumination light to the pre-reduction amount of illumination light.

This makes it possible to ensure the visibility to the driver of the vehicle 100 while mitigating glare to the vehicle in front, etc.

In the following, description is given of control processing of the headlight unit 21 by the headlight ECU 11 configured as described above, with reference to a flowchart in FIG. 3.

In an environment in which the outside is dark, e.g., at nighttime, the vehicle 100 travels while sending out the low beam or the high beam from the headlight unit 21 in accordance with the light distribution patterns set by the light distribution controller 122 of the headlight ECU 11. In this embodiment, description is given assuming that the predetermined distance L1 is set to the smaller distance than the inter-vehicle distance d at which the switching from the high beam to the low beam is made.

At this occasion, in the vehicle 100, the camera 23 may capture frontward images of the vehicle 100 on predetermined cycles, and output the captured images to the external monitoring ECU 12. The radar 24 may measure, on predetermined cycles, the positional relation and the distance to other vehicles including the vehicle in front, pedestrians, etc. present around the vehicle 100, and output a result of measurement to the external monitoring ECU 12. When another vehicle is present in front of the vehicle 100, based on the images outputted from the camera 23 or the result of measurement by the radar 24, the external monitoring ECU 12 may output the inter-vehicle distance d indicating the distance from the vehicle 100 to the vehicle in front.

In the headlight ECU 11, the inter-vehicle distance obtainer 121 may acquire the inter-vehicle distance d from the external monitoring ECU 12 through the in-vehicle network 3 (step S11), and monitor whether the inter-vehicle distance d is less than the predetermined distance L1 (step S12). When the inter-vehicle distance d is less than the predetermined distance L1 (YES in step S12), the inter-vehicle distance obtainer 121 may notify the illumination controller 123 of that, to allow the illumination controller 123 to control the headlight unit 21 to reduce the amount of illumination light (step S13).

At this occasion, in the headlight unit 21, the low beam by the low beam unit 21A is being sent out, and the illumination controller 123 may reduce the amount of illumination light of the low beam to a smaller amount of illumination light than a current amount of illumination light. The inter-vehicle distance obtainer 121 may continuously acquire the inter-vehicle distance d from the vehicle in front to the vehicle 100 even after the amount of illumination light is reduced (step S14).

Based on the inter-vehicle distance d, the inter-vehicle distance obtainer 121 may determine whether the vehicle 100 has passed the vehicle in front (step S15). When the vehicle 100 has not passed the vehicle in front (NO in step S15), the inter-vehicle distance obtainer 121 may determine whether the inter-vehicle distance d is larger than the predetermined distance L2 (step S16). When the inter-vehicle distance d is larger than the predetermined distance L2 (YES in step S16) and when the vehicle 100 has passed the vehicle in front (YES in step S15), the inter-vehicle distance obtainer 121 may notify the illumination controller 123 of that. The illumination controller 123 may control the headlight unit 21 to restore the reduced amount of illumination light to the pre-reduction amount of illumination light (step S17).

(Modification Example)

As the light sources of the low beam unit 21A and the high beam unit 21B, a light source unit and an array light source may be applicable. The light source unit may include, for example, multiple segments arranged in matrix and each configured to be independently subject to a lighting control. In the array light source, light emitting elements are arranged in matrix.

In this case, when the inter-vehicle distance d from the vehicle 100 to the vehicle in front acquired by the inter-vehicle distance obtainer 121 is less than the certain distance, that is, when the inter-vehicle distance d is less than the predetermined distance L1, the light distribution controller 122 is configured to set an illumination range of the low beam unit 21A, and set a light distribution pattern in which a region corresponding to the position of the vehicle in front, etc. within the illumination range of the low beam unit 21A is identified as a specific region to be partially dimmed or shaded.

The illumination controller 123 may output, to the headlight unit 21, a driving signal indicating a lighted state of each segment or each light emitting element corresponding to the illumination range of the low beam unit 21A in accordance with the light distribution pattern set by the light distribution controller 122.

This makes it possible to make a control to partially dim or shade the specific region corresponding to the position of the vehicle in front, etc. within the illumination range of the low beam unit 21A.

In one example, the illumination controller 123 may make a control to reduce the amount of illumination light in each segment or each light emitting element corresponding to the specific region, out of the segments or the light emitting elements corresponding to the illumination range of the low beam unit 21A. Alternatively, the illumination controller 123 may control the headlight unit 21 to change each segment or each light emitting element corresponding to the specific region, from the lighted state to a non-lighted state.

In the following, description is given of control processing of the headlight unit 21 by the headlight ECU 11 in the modification example, with reference to a flowchart in FIG. 4.

In the environment in which the outside is dark, e.g., at nighttime, the vehicle 100 travels while sending out the low beam or the high beam from the headlight unit 21 in accordance with the light distribution patterns set by the light distribution controller 122 of the headlight ECU 11. In this modification example as well, description is given assuming that the predetermined distance L1 is set to the smaller distance than the inter-vehicle distance d at which the switching from the high beam to the low beam is made.

At this occasion, in the vehicle 100, the camera 23 may capture the frontward images of the vehicle 100 on the predetermined cycles, and output the captured images to the external monitoring ECU 12. The radar 24 may measure, on the predetermined cycles, the positional relation and the distance to other vehicles including the vehicle in front, pedestrians, etc. present around the vehicle 100, and output the result of measurement to the external monitoring ECU 12. When another vehicle is present in front of the vehicle 100, based on the images outputted from the camera 23 or the result of measurement by the radar 24, the external monitoring ECU 12 may output the inter-vehicle distance d indicating the distance from the vehicle 100 to the vehicle in front.

In the headlight ECU 11, the inter-vehicle distance obtainer 121 may acquire the inter-vehicle distance d from the external monitoring ECU 12 through the in-vehicle network 3 (step S21), and monitor whether the inter-vehicle distance d is less than the predetermined distance L1 (step S22). When the inter-vehicle distance d is less than the predetermined distance L1 (YES in step S22), the inter-vehicle distance obtainer 121 may notify the light distribution controller 122 and the illumination controller 123 of that.

The light distribution controller 122 may set the illumination range of the low beam unit 21A, and set the light distribution pattern in which the region corresponding to the position of the vehicle in front, etc. within the illumination range of the low beam unit 21A is identified as the specific region to be partially dimmed or shaded (step S23). The illumination controller 123 may control the headlight unit 21 in accordance with the light distribution pattern set by the light distribution controller 122, to make a control to reduce the amount of illumination light in the specific region, or shade the specific region (step S24).

The inter-vehicle distance obtainer 121 may continuously acquire the inter-vehicle distance d from the vehicle in front to the vehicle 100 even after the amount of illumination light is reduced (step S25). Based on the inter-vehicle distance d, the inter-vehicle distance obtainer 121 may determine whether the vehicle 100 has passed the vehicle in front (step S26). When the vehicle 100 has not passed the vehicle in front (NO in step S26), the inter-vehicle distance obtainer 121 may determine whether the inter-vehicle distance d is larger than the predetermined distance L2 (step S27).

When the inter-vehicle distance d is larger than the predetermined distance L2 (YES in step S27) and when the vehicle 100 has passed the vehicle in front (YES in step S26), the inter-vehicle distance obtainer 121 may notify the illumination controller 123 of that. The illumination controller 123 may control the headlight unit 21 to restore the amount of illumination light in the specific region dimmed or shaded, to a pre-dimming or pre-shading amount of illumination light (step S28).

As described, the amount of illumination light in the specific region corresponding to the vehicle in front is reduced, or the specific region is shaded. This makes it possible to dim or shade the region in which glare to the vehicle in front may be possibly produced, within the illumination range. Hence, it is possible to optimize the illumination range and mitigate glare to the oncoming vehicle or the preceding vehicle, even for a vehicle including headlights at a high ground level, or headlights having high intensity of illumination.

In the case where the vehicle in front is an oncoming vehicle, when the vehicle 100 and the oncoming vehicle pass each other after the specific region is dimmed or shaded, the amount of illumination light in the dimmed or shaded specific region may be restored to an original amount of illumination light. Hence, it is possible to ensure the visibility to the driver of the vehicle 100.

Similarly, in the case where the vehicle in front is a preceding vehicle, when inter-vehicle distance d is larger than the predetermined distance L2 after the specific region is dimmed or shaded, to ensure the inter-vehicle distance large enough to prevent the illumination by the low beam of the vehicle 100 from producing glare to the preceding vehicle, the amount of illumination light in the dimmed or shaded specific region may be restored to the original amount of illumination light. Hence, it is possible to ensure the visibility to the driver of the vehicle 100.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. The forgoing example embodiments may be combined by diverting the technologies to one another in so far as there is no particular contradiction or issue in their purposes and configurations.

The inter-vehicle distance obtainer 121, the light distribution controller 122, and the illumination controller 123 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the inter-vehicle distance obtainer 121, the light distribution controller 122, and the illumination controller 123. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the inter-vehicle distance obtainer 121, the light distribution controller 122, and the illumination controller 123 illustrated in FIG. 2.

The invention claimed is:

1. A headlight controller configured to control a headlight unit, the headlight unit being configured to send out illumination light frontward of a vehicle, the headlight controller comprising:

an inter-vehicle distance obtainer configured to acquire an inter-vehicle distance from the vehicle to a vehicle in front traveling in front, the vehicle in front being a preceding vehicle traveling ahead of the vehicle in a same direction of advance as the vehicle or an oncoming vehicle with respect to the vehicle;

a light distribution controller configured to partially dim or shade, within an illumination range of the headlight unit, a range corresponding to a position of the vehicle in front; and an illumination controller configured to reduce an amount of illumination light of a low beam by the headlight unit when the inter-vehicle distance is less than a first distance, wherein the headlight unit includes a low beam unit configured to send out the low beam and a high beam unit configured to send out a high beam, wherein the light distribution controller is configured to switch the headlight unit from the high beam to the low beam when the inter-vehicle distance is less than a switching distance, wherein the first distance is shorter than the switching distance, and the illumination controller is configured to, after the headlight unit switches from the high beam to the low beam and when the inter-vehicle distance is less than the first distance, reduce an overall amount of illumination light emitted as the low beam by the low beam unit, regardless of whether the light distribution controller partially dims or shades the range corresponding to the position of the vehicle in front.

2. The headlight controller according to claim 1, wherein the light distribution controller is configured to set, within an illumination range of the low beam emitted by the low beam unit, a light distribution pattern in which a specific region corresponding to the position of the vehicle in front is identified as a region to be partially dimmed or shaded, and wherein the illumination controller is configured to control the headlight unit in accordance with the light distribution pattern to reduce an amount of illumination light in the specific region or shade the specific region.

3. The headlight controller according to claim 2, wherein the low beam unit comprises an array light source in which light emitting elements are arranged in a matrix, and the illumination controller is configured to dim or shade the specific region by controlling lighted states of the light emitting elements.

4. The headlight controller according to claim 2, wherein the low beam unit comprises a light source unit including multiple segments each configured to be independently subject to a lighting control, and the illumination controller is configured to dim or shade the specific region by controlling lighted states of the multiple segments.

5. The headlight controller according to claim 2, wherein the illumination controller is configured to, when the inter-vehicle distance is less than the first distance, reduce gradually or stepwise an amount of illumination light in the specific region in accordance with the inter-vehicle distance.

6. The headlight controller according to claim 2, wherein in a case where the vehicle in front is a preceding vehicle, the illumination controller is configured to, when the inter-vehicle distance between the vehicle and the preceding vehicle is larger than a second distance, restore an amount of illumination light in the specific region to a pre-dimming or pre-shading amount of illumination light.

7. The headlight controller according to claim 2, wherein in a case where the vehicle in front is the on-coming vehicle, the illumination controller is configured to, after the vehicle and the on-coming vehicle pass each other, restore an amount of illumination light in the specific region to a pre-dimming or pre-shading amount of illumination light.

8. The headlight controller according to claim 2, wherein the light distribution controller is configured to, when the inter-vehicle distance is less than the first distance, set an illumination range of the low beam unit and set a light distribution pattern in which the specific region corresponding to the position of the vehicle in front within the illumination range of the low beam unit is identified as a region to be partially dimmed or shaded.

9. The headlight controller according to claim 3, wherein the illumination controller is configured to, when the inter-vehicle distance is less than the first distance, reduce gradually or stepwise an amount of illumination light in the specific region in accordance with the inter-vehicle distance.

10. The headlight controller according to claim 3, wherein in a case where the vehicle in front is a preceding vehicle, the illumination controller is configured to, when the inter-vehicle distance between the vehicle and the preceding vehicle is larger than a second distance, restore an amount of illumination light in the specific region to a pre-dimming or pre-shading amount of illumination light.

11. The headlight controller according to claim 3 wherein in a case where the vehicle in front is the on-coming vehicle, the illumination controller is configured to, after the vehicle and the on-coming vehicle pass each other, restore an amount of illumination light in the specific region to a pre-dimming or pre-shading amount of illumination light.

12. The headlight controller according to claim 4, wherein the illumination controller is configured to, when the inter-vehicle distance is less than the first distance, reduce gradually or stepwise an amount of illumination light in the specific region in accordance with the inter-vehicle distance.

13. The headlight controller according to claim 4, wherein in a case where the vehicle in front is a preceding vehicle, the illumination controller is configured to, when the inter-vehicle distance between the vehicle and the preceding vehicle is larger than a second distance, restore an amount of illumination light in the specific region to a pre-dimming or pre-shading amount of illumination light.

14. The headlight controller according to claim 4 wherein in a case where the vehicle in front is the on-coming vehicle, the illumination controller is configured to, after the vehicle and the on-coming vehicle pass each other, restore an amount of illumination light in the specific region to a pre-dimming or pre-shading amount of illumination light.

15. The headlight controller according to claim 8, wherein the illumination controller is configured to control the headlight unit in accordance with the light distribution pattern set by the light distribution controller to reduce an amount of illumination light in the specific region or shade the specific region.

16. The headlight controller according to claim 1, wherein the illumination controller is configured to, when the inter-vehicle distance is less than the first distance, reduce gradually or stepwise the overall amount of illumination light emitted as the low beam by the low beam unit in accordance with the inter-vehicle distance.

17. The headlight controller according to claim 1, wherein in a case where the vehicle in front is a preceding vehicle, the illumination controller is configured to, when the inter-vehicle distance between the vehicle and the preceding vehicle is larger than a second distance, restore the overall amount of illumination light emitted as the low beam by the low beam unit to a pre-reduction amount of illumination light.

18. The headlight controller according to claim 1, wherein in a case where the vehicle in front is the on-coming vehicle, the illumination controller is configured to, after the vehicle and the on-coming vehicle pass each other, restore the overall amount of illumination light emitted as the low beam by the low beam unit to a pre-reduction amount of illumination light.

19. The headlight controller according to claim 1, wherein, in reducing the overall amount of illumination light emitted as the low beam by the low beam unit, the illumination controller is configured to determine a reduction amount by which the overall amount of illumination light is reduced based on a ground level of the headlight unit or illumination ability of the headlight unit.

20. The headlight controller according to claim 19, further comprising a storage configured to hold the reduction amount determined based on the ground level of the headlight unit or the illumination ability of the headlight unit.

21. A headlight controller configured to control a headlight unit including a light source, the headlight unit being configured to send out illumination light frontward of a vehicle, the headlight controller comprising circuitry configured to:

acquire an inter-vehicle distance from the vehicle to a vehicle in front, the vehicle in front being a preceding vehicle traveling ahead of the vehicle in a same direction of advance as the vehicle or an on-coming vehicle with respect to the vehicle;

partially dim or shade within an illumination range of the headlight unit, a range corresponding to a position of the vehicle in front; and reduce an amount of illumination light of a low beam by the headlight unit when the inter-vehicle distance is less than a first distance, wherein the headlight unit includes a low beam unit configured to send out the low beam and a high beam unit configured to send out a high beam, wherein the circuitry is configured to switch the headlight unit from the high beam to the low beam when the inter-vehicle distance is less than a switching distance, wherein the first distance is shorter than the switching distance, and wherein the circuitry is configured to, after the headlight unit switches from the high beam to the low beam and when the inter-vehicle distance is less than the first distance, reduce an overall amount of illumination light emitted as the low beam by the low beam unit, regardless of whether the circuitry partially dims or shades the range corresponding to the position of the vehicle in front.

* * * * *